Sept. 26, 1967      O. V. JONES      3,343,460
METHOD AND MEANS FOR JOINING END CAPS TO A CYLINDER
Filed Aug. 20, 1965
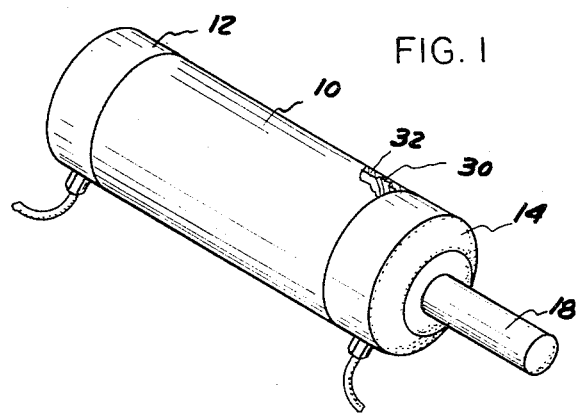
FIG. 1
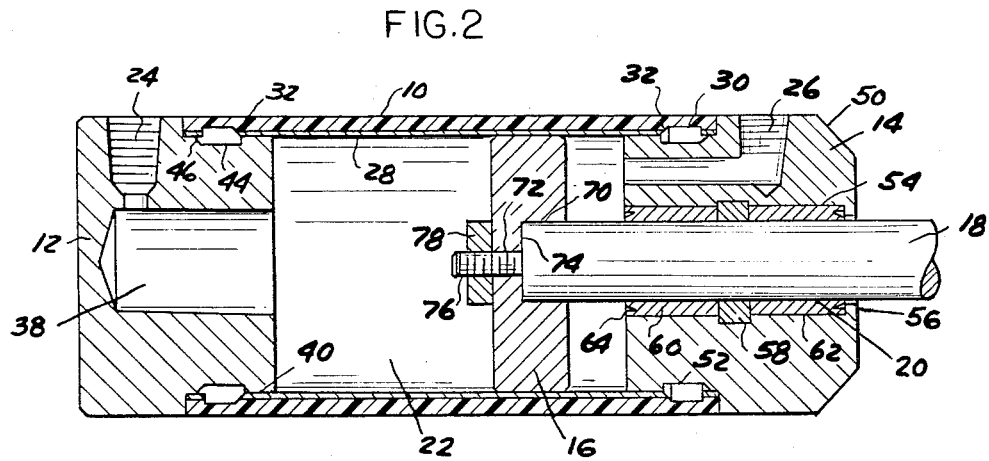
FIG. 2
FIG. 3
FIG. 4
INVENTOR
OTIS V. JONES
BY *Allen M. Krass*
ATTORNEY United States Patent Office 3,343,460
Patented Sept. 26, 1967

3,343,460
METHOD AND MEANS FOR JOINING END CAPS TO A CYLINDER
Otis V. Jones, 6028 Huron St., Dearborn, Mich. 48125
Filed Aug. 20, 1965, Ser. No. 481,228
3 Claims. (Cl. 92—168)

This invention relates to a linear actuator of the type consisting of a piston movable within a cylinder and having a rod which extends through an end cap of the cylinder, and more particularly to a unique construction for such a piston-cylinder combination.

Prior art actuators of this broad class have normally employed cylinders formed of tubular steel joined to steel end caps by rather elaborate constructions. It has been recently proposed to form the cylinder walls of tubing consisting of glass filament reinforced with an epoxy. Such tubing provides optimum qualities of mechanical strength, smooth internal finish, light, weight, and corrosion resistance. The present invention specifically relates to a linear actuator of the cylinder-piston type employing a cylinder formed of glass filament reinforced with an epoxy resin and particularly to a unique construction for the joinder between the tubing and the cylinder end caps.

It is relatively easy and inexpensive to provide high strength in a cylinder wall and in the end caps. The weakest section in the cylinder is the joinder between the walls and the end caps. The present invention contemplates a simple, low cost technique for joining the two which results in a high strength connection of a permanent nature.

In its broadest aspect the present invention consists of joining an epoxy reinforced glass filament cylinder to a metal end cap by providing an end cap with a diameter which equals or exceeds that of the cylinder and forming a reduced section on one end of the cap with an outer diameter such as will make a slip fit with the inner diameter of the cylinder wall. Grooves are formed in this reduced section and in the interior diameter of the tubing wall, adjacent to the end thereof. The particular construction of the parts is such as to allow them to be partially assembled so that an epoxy resin may be injected into the two grooves. The assembly is then completed so that the grooves in the cylinder wall and the end cap are brought into opposing relation to one another and the epoxy is allowed to set. It forms an extremely intimate bond with both the epoxy of the cylinder wall and the metal of the end cap, and additionally forms a unitary structure which acts in the manner of a steel ring to join the two together in a solid assembly.

The broad invention contemplates the use of any method to inject the resin into the space between the grooves, but a narrow aspect of the invention resides in the particular construction of the tubing ends and the end caps which allows the epoxy to be injected in a simple manner, without the formation of any special holes in the tubing wall. As disclosed in the subsequent detailed description of a preferred embodiment of the invention, this construction involves the placement of the grooves in the cylinder wall and the end cap. In this embodiment the groove in the cylinder wall is displaced from the end of the wall by a distance less than the width of the grooves. This construction allows the cylinder end to be slipped over the reduced section of the end cap to a point where the ends of the grooves overlap one another but the end of the cylinder does not completely block access to the groove in the end cap. Epoxy may then be injected into both of the grooves and the assembly may be completed by slipping the cylinder over the end cap until the two grooves are in direct opposition to one another and the end of the cylinder is in abutment to the shoulder formed in the end cap between the regular section and the narrow section.

It is therefore seen that a primary object of the present invention is to provide a construction for a linear actuator of the piston and cylinder type wherein the cylinder tube and the mating end caps are each formed with grooves and an air curing resin is injected into the grooves so as to solidify into a unitary structure and lock the end caps to the tube.

Another object is to provide such a construction wherein the cylinder tube is formed of an epoxy reinforced material and the resin injected in the grooves is also an epoxy so that the two will bind together into one unitary structure.

Another object is to provide such a construction wherein the tube end slides over a reduced section in the end cap and the groove in the tube is displaced from the end of the tube by a distance less than the width of the grooves.

Other objects, advantages, and applications of the present invention will be made apparent by the following detailed description of a preferred embodiment of the invention. The description makes reference to the accompanying drawings in which:

FIGURE 1 is a perspective view of a preferred embodiment of the linear actuator, with sections broken away for purposes of illustration;

FIGURE 2 is a longitudinal sectional view through the actuator of the preferred embodiment, taken along line 2—2 of FIGURE 1;

FIGURE 3 is a perspective view of a combination bearing and wiper, used in connection with the present invention; and FIGURE 4 is a sectional view through the ends of the tube and end cap showing them in partial assembled relation.

Referring to the drawings, the linear actuator of the preferred embodiment broadly consists of a tubular cylinder wall 10, sealed at one end by a rear end cap 12, and at the other end by a forward end cap 14 and enclosing a piston 16 which is connected to the end of and drives a piston rod 18. The rod 18 passes through an aperture, generally indicated at 20, formed centrally within the forward end cap 14, for the purpose of communicating the motion of the piston 16 to appropriate connected mechanism. The piston 16 moves within the interior chamber 22 defined by the inner walls of the cylinder tube 10 and the opposing sides of the end caps 12 and 14. Air or hydraulic fluid may be admitted to or ejected from the chamber 22 through fluid connections 24 and 26 which be joined to appropriate hydraulic circuitry (not shown).

The tube 10 used in the present invention to form the cylinder wall is basically formed of filament wound fiber glass reinforced with an epoxy resin. The internal diameter of the tube 10 is coated with a thin liner 28 of molybdenum disulfide dispersed in an epoxy matrix. The lining 28 may be approximately 0.01 inch in thickness and provides the cylinder with excellent self-lubricating properties with respect to motion of the piston 16. Tubing of the type used to form the cylinder wall 10 is manufactured by Dow Smith Inc. of Little Rock, Ark. and marketed under the trademark "Molycore."

A pair of identical grooves 30 are formed about the interior diameter of the tube 10 adjacent to, but narrowly separated from, its extreme ends. These grooves 30 are preferably formed to a sufficient depth to penetrate the lining 28 so that the bottom of the groove is formed of the reinforced fiber glass of the main tube section. The side walls of the grooves 30 adjacent to the two ends of the tube are square and the opposite walls are inclined as at 32 for ease in assembling the tube 10 to the end caps 12 and 14.

The width of the grooves 30 and their distances from the extreme ends of the tube 10 are of some importance, as will be noted subsequently, and for purposes of identification the two ends of the grooves will be denominated A and B and the end of the tube adjacent to the groove end B will be denominated C.

The rear end cap 12 is generally cylindrical in form. It has a central recess 38 which communicates with the fluid orifice 24 formed on the side of the end cap. It has a reduced diameter section 40 which is joined to the main diameter section by a step 42. The main diameter section preferably has an outer diameter at least equal to the outer diameter of the tube 10. A groove 44 is formed in the reduced diameter step 40. The groove 44 is preferably identical in configuration to the grooves 30 except that it has an inclined end 46 reversed with respect to its mating groove 30 on one end of the tube 10. The wall on the end of the groove adjacent to that end of the cap is denominated "D" while the end surface of the end cap is denominated "E."

The forward end cap 14 is basically cylindrical shape with a truncated conical end 50. It has a groove 52 which is identical to and positioned similarly to the groove 44 in the rear end cap. The opening 20 in the center of the end cap 14 consists of a central aperture 54 having a diameter greater than the diameter of the piston rod 18. At its outer side the opening 54 is partially closed off by a shoulder 56. At its center, a groove 58 is formed in the opening.

A pair of Teflon sleeve bearings 60 and 62 are positioned in the opening 54 on the opposite sides of the groove 58. One of the bearings 60 is shown in perspective in FIGURE 4. It consists of a hollow cylinder of Teflon with a V-shaped groove 64 formed in one exposed edge. One of the walls of the groove is generally parallel to the side wall and the other tapers upwardly to the interior diameter of the bearing. This outer wall is bent outwardly into the interior diameter and acts as a wiper for the rod 18 of the piston.

The space between the adjacent sides of the bearings 60 and 62 is filled with a heavy grease or cellulose base permanent lubricant material. As the rod 18 moves through the opening 20 it is continually lubricated by the material in the groove 58 and wiped by the ends 64 of the bearings 62. This forms a permanent type assembly that does not have to be oiled.

The piston 16 may be of any suitable variety. In the preferred embodiment it is formed as a rubber disc having a large diameter opening 70 and a smaller diameter opening 72 joined by a shoulder 74. The piston rod 18 has a small diameter threaded end member 76 and the shoulder between the end member 76 and the main diameter of the rod 18 abuts the shoulder 74. The end 76 projects from the rear of the piston and is fixed thereon by a suitable nut 78.

FIGURE 3 illustrates the manner in which the cylinder tube 10 is assembled to the end caps 12 and 14. This method of assembly depends on the fact that the width of the grooves A–B is greater than the distance B–C between the end of the groove and the adjacent end of the tube. In assembling the unit the end of the tube 10 is slipped over the reduced shoulder on one of the end caps so that the end of the tube C projects over the groove 44 formed in the end cap. In this position the cavity formed by the grooves 30 and 44 is filled with the epoxy resin and then the tube is pushed fully over the end cap so that the end C abuts the shoulder 42 of the cap. The amount of resin injected into the partially closed cavity is sufficient to just fill the entire cavity. After the resin is set it becomes closely adhered and practically integral with the resin in the exposed surface of the groove 30 and similarly locks in the groove 44 so as to provide a permanent seal and physical lock therebetween.

While other techniques might be used to inject the epoxy into the reservoir, such as forming small holes in the wall of the groove 30 and injecting resin into them after the groove is filled, all such techniques are subject to serious disadvantages, and while useful in connection with the broad aspect of the invention, they are believed to be technologically superseded by the narrow aspect of the invention.

Having thus described my invention, I claim:

1. A linear actuator of the cylinder-piston type, comprising: a cylinder wall formed of a section of tube of a glass filament construction, reinforced with an epoxy resin, having first continuous and unperforated grooves formed on one of its surfaces adjacent to each of its ends; end caps for the cylinder each having a diameter formed thereon which is complementary to the diameter of the surface of the tube which is grooved; second continuous and unperforated grooves formed in the end caps; the end caps being disposed in mating relationship with the ends of the tubes so that the grooves on the tube and the grooves on the end caps are in opposition to one another; either the first or second grooves being displaced from the end of its respective member by a distance less than the width of the respective opposed grooves; a resin filling the space formed by the grooves on the tube and the grooves on the end caps, whereby an intimate bond is formed with said tube and said end caps; a piston movable within said cylinder; and a rod connected to said piston and passing through an aperture in one of the end caps.

2. The actuator of claim 1 wherein a molybdenum disulfide liner is formed on the interior cylinder wall.

3. The method of joining end caps to a cylinder, comprising: forming the cylinder with a groove adjacent to one of the ends, said groove being of a particular width and being separated from the end of the tube by a distance less than that width; forming an end cap having a surface complementary to the grooved surface of the tube with a groove formed on such surface at a distance from the end of the end cap which is less than the width of the end cap groove; inserting the end cap surface into the complementary surface of the tube so that the end of the tube is positioned over a portion of the groove in the end caps; inserting a liquid resin into the cavity thus formed between the groove in the tube and the groove in the end cap; closing the tube over the end cap so as to bring the two grooves into direct opposition to one another; and allowing the resin to set.

References Cited

UNITED STATES PATENTS

| | | | |
|---|---|---|---|
| 339,036 | 3/1886 | Wilbur | 29—460 X |
| 2,678,853 | 5/1954 | Reeder | 156—294 X |
| 2,997,026 | 8/1961 | Zimmerer | 92—169 X |
| 3,040,712 | 6/1962 | Harrah | 92—170 X |
| 3,223,002 | 12/1965 | Edenborough | 92—169 |

FOREIGN PATENTS 971,481  9/1964  Great Britain.

EDGAR W. GEOGHEGAN, *Primary Examiner.*

MARTIN P. SCHWADRON, *Examiner.*

I. C. COHEN, *Assistant Examiner.*